July 10, 1956 A. L. SPRECKER ET AL 2,754,495

SELECTIVE SWITCHING DEVICE

Filed April 9, 1953 4 Sheets-Sheet 1

INVENTORS
W. F. HENRY
A. L. SPRECKER

BY

R. E. Sandt
AGENT

INVENTORS
W. F. HENRY
A. L. SPRECKER
BY
R. E. Sandt
AGENT

July 10, 1956 A. L. SPRECKER ET AL 2,754,495

SELECTIVE SWITCHING DEVICE

Filed April 9, 1953 4 Sheets-Sheet 3

INVENTORS
W. F. HENRY
A. L. SPRECKER

BY

R. E. Sandt
AGENT

July 10, 1956

A. L. SPRECKER ET AL 2,754,495

SELECTIVE SWITCHING DEVICE

Filed April 9, 1953

4 Sheets-Sheet 4

*INVENTORS*
W.F. HENRY
A.L. SPRECKER

*BY*

A.E. Sandt
AGENT

United States Patent Office 2,754,495

Patented July 10, 1956

2,754,495

SELECTIVE SWITCHING DEVICE

Alfred L. Sprecker, Paramus, N. J., and William F. Henry, Endicott, N. Y., assignors to International Business Machines Corporation, New York, N. Y., a corporation of New York Application April 9, 1953, Serial No. 347,762

6 Claims. (Cl. 340—164)

This invention relates to selective switching devices and more particularly to switching devices which are selectively operable responsive to coded signals having a predetermined minimum duration and a predetermined time spacing.

Although the present invention is suitable for use in any selective switching system in which a plurality of switching devices are connected to a common signal line, it is particularly adapted for use in conjunction with an electronic time system such as that disclosed in the Wagner et al. application, Serial No. 101,884, filed June 28, 1949, now Patent 2,647,360 issued August 8, 1953. An illustrative use of the instant invention in such a system would be in a school wherein it is desirable to sound bells selectively in individual classrooms by means of high frequency coded signals superimposed on the 60 cycle power lines which also supply both the regulated power to operate the various synchronous indicating clocks located throughout the school and the superimposed high frequency signals for regulating the clocks.

An object of the present invention is to provide a selective switching device which is operated responsive to coded impulses having a predetermined minimum duration and a predetermined time interval between the initiation of successive impulses.

A further object is to provide a switching device of the above nature which operates on a cyclical basis, wherein the device starts from an initial position and returns thereto at the completion of each operation.

Another object is to provide a switching device of the above nature which is immediately reset upon the cessation of an impulse of less than the predetermined minimum duration.

A still further object is to provide a switching device of the above nature wherein the device can be readily set to operate responsive to any one of a plurality of predetermined codes.

A final object is to provide a switching device of the above nature wherein the operation of the local work circuit always occurs at the same time after the initial impulse regardless of the code for which the device is set.

Other objects of the invention will be pointed out in the following description and claims and illustrated in the accompanying drawings, which disclose, by way of example, the principle of the invention and the best mode, which has been contemplated, of applying that principle.

Figures 3A, 7, 8, 8A:
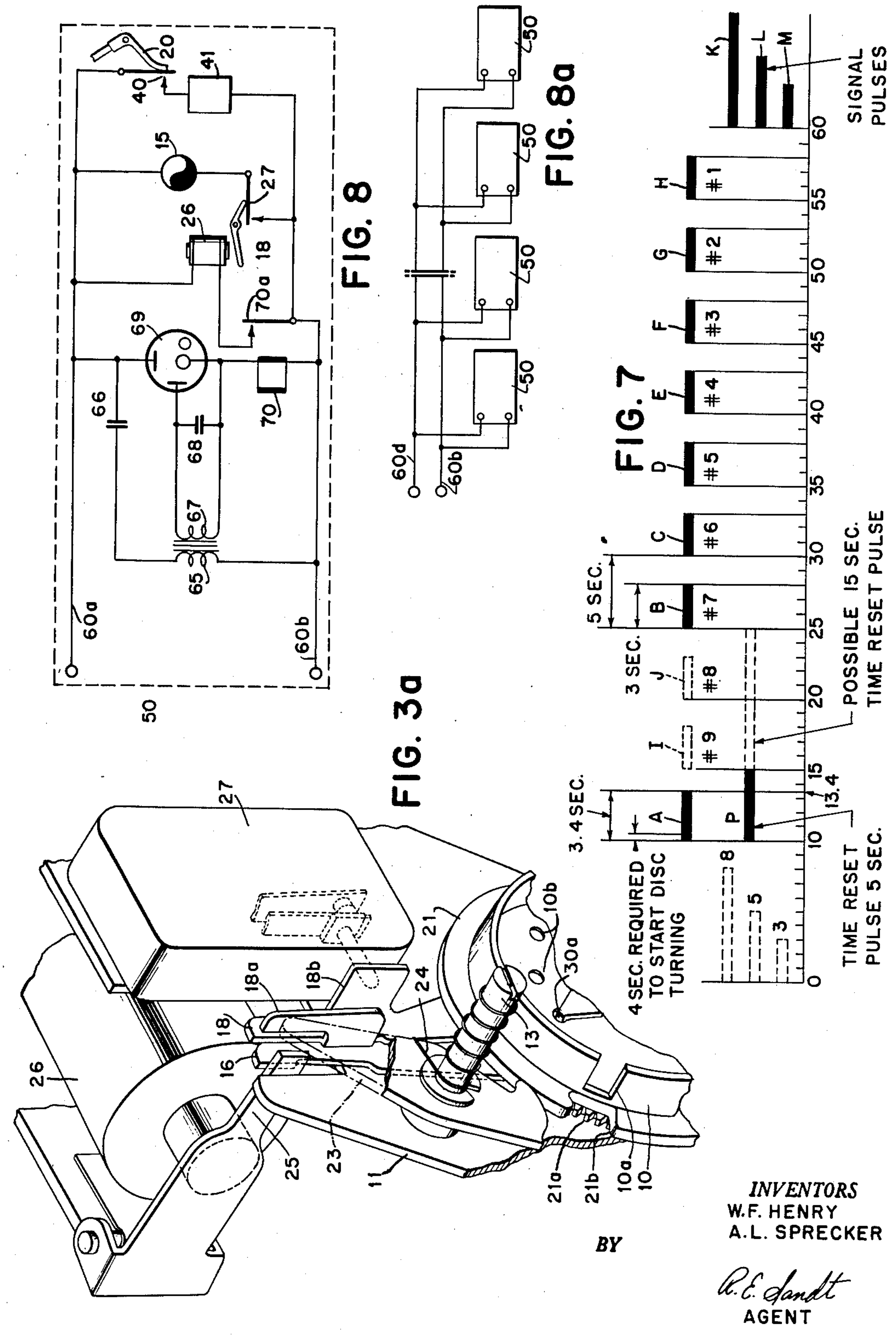
Fig. 3a is an isometric view of a portion of the device with the parts in the same relative position as in Fig. 3.
Fig. 7 is a chart showing the timing of the coded pulses.
Fig. 8 is a wiring diagram of the instant device and its connection to the power line.
Fig. 8a is a schematic wiring diagram showing the connection of a plurality of the instant devices to the power line.

In Fig. 8, the connection of the switching device for use in conjunction with the system disclosed in the referenced Wagner et al. application is shown. In this figure the same reference numerals have been applied to similar components as in Fig. 7 of Wagner et al. Referring to Fig. 8, 60*a* and 60*b* are the usual distribution lines for a single phase of a standard 60 cycle current supply upon which are superimposed 3500 cycle current impulses at timed intervals for purposes of clock regulation and for the actuation of the instant device. Across the power lines is connected the series circuit including the capacitor 66 and the coil 65 to form a circuit resonant at the signal frequency. Inductively coupled to 65 is the coil 67 which with the capacitor 68 forms a parallel circuit also resonant at the signal frequency. The capacitor 66 and the coil 65 present a high impedance to all frequencies other than the signal frequency so that the secondary circuit is only influenced by currents of signal frequency so as to raise the potential of the starting anode of the cold cathode gas-filled thyratron 69 to ignite the tube and produce a current flow therethrough to energize the coil 70 for the duration of the signal. The coil 70 is the actuating coil of a relay having the normally open contacts 70*a*, which contacts control both the actuation of the switching device, and the clock regulating mechanism.

Referring now to Fig. 7 which shows the relative timing of the signalling impulses to which the switching device can be set to be responsive, it will be noted that the operation is of a cyclical nature, a complete cycle having a duration of one minute. The operation of the switching device requires two signalling pulses having a predetermined minimum duration and a predetermined spacing in point of time. Each of the plurality of switching devices connected to the common signal line has its own code, so that only one device is actuated responsive to a given code. The "A" pulse (Fig. 7) is shown to have a duration of 3.4 seconds which duration is the minimum to which the device is responsive, as will be explained in the mechanical description thereof. The "A" impulse initiates a cycle of operation of all of the switching devices 50 connected to the signalling line as in Fig. 8*a*. The "B" through "H" impulses have a duration of three seconds and are spaced at five-second intervals, with the "B" impulse starting fifteen seconds after the beginning of the "A" impulse. These impulses are selectively transmitted according to the desired one of the switching devices to be operated. The "K," "L" and "M" pulses represent the duration of "make" of the local work circuit closed by the switching device, this "make" always beginning at fifty seconds after the initiation of the "A" impulse, is adjustable to 3, 5 or 8 seconds duration by structure within the switching device as will be explained.

In order that the impulses for operating the switching devices do not initiate a reset cycle of the secondary clocks in the system, the secondary clocks have a time delay mechanism such as that disclosed in the Larrabee Patent 2,569,815 issued October 2, 1951, which mechanism is readjusted so as to be non-responsive to signals of less than five seconds duration. Inasmuch as two clock synchronizing impulses are never delivered within the same minute the switching devices on the line will not be operated by a clock synchronizing impulse. It is further possible to combine the clock synchronizing impulse represented by "P" (Fig. 7) with a second impulse at "B," or "C," or "D," etc. to operate a selected one of the switching devices. Usually the clock synchronizing impulses are delivered at the beginning of the fifty-eighth minute and a cycle of operation of all the switching devices connected to the line is thereby initiated. If a second impulse is delivered at the correct time after the beginning of the time synchronizing pulse "P" (Fig. 7) then the appropriate switching device will be operated to close its work circuit at 58′50″.

The normal use of the switching device is to transmit the "A" impulse beginning at ten seconds after the beginning of the minute, the second impulse at the time necessary to actuate the desired one of the switching devices, so that the work circuit will be operated at the beginning of the next minute. The keying of the transmitter which generates the high frequency code signal can either be controlled by contacts on the master clock which is part of the clock system disclosed in the referenced Wagner et al. application or by any suitable mechanism. The transmitter could even be keyed manually with a telegraph key, the operator making visual reference to the sweep second hand of a clock so as to space the signalling pulses at the required time.

Figure 6:
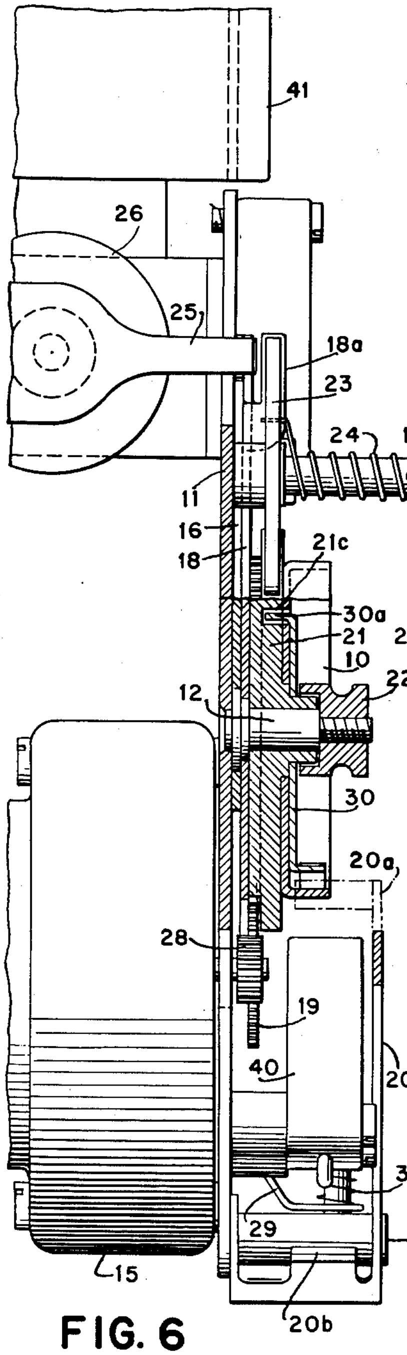
Fig. 6 is a partial section taken along the line 6—6 in Fig. 1.
Figure 1:
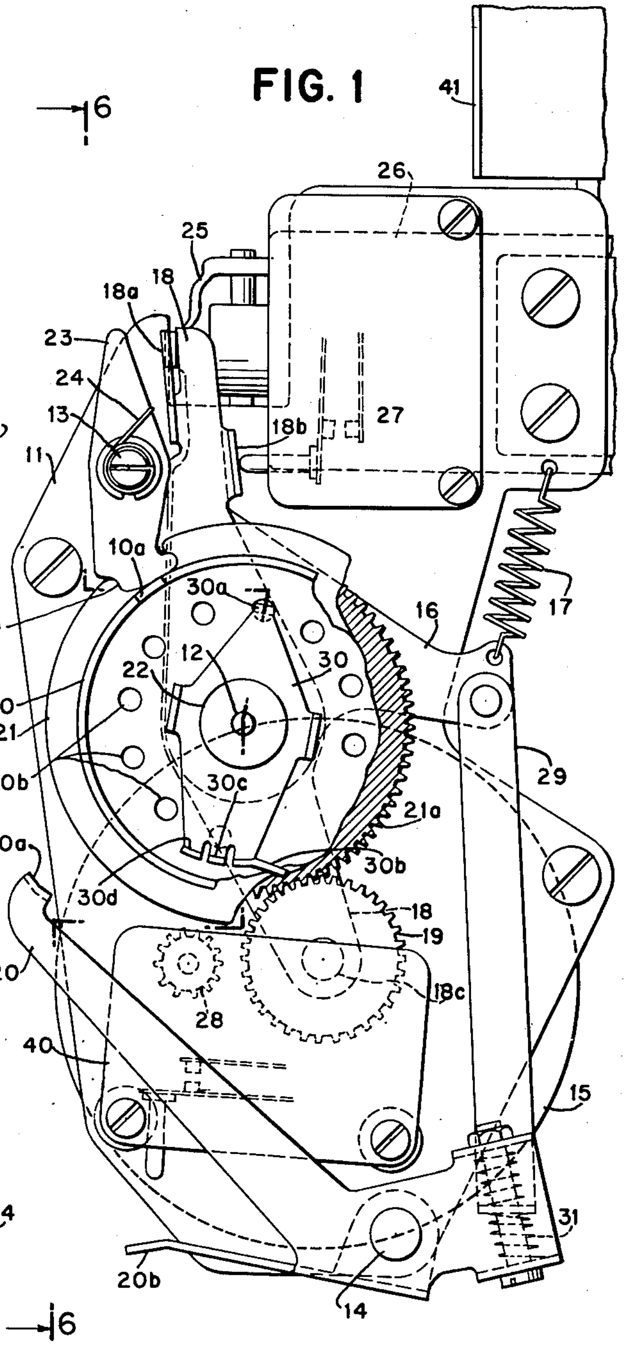
Fig. 1 is a front elevation of the switching device with certain parts broken away, the parts being shown in the initial or rest position prior to reception of any impulses.

Referring now to Figs. 1 and 6, the switching device comprises basically a cup-shaped code wheel 10 which rotates a complete revolution in one minute upon receipt of the initiating impulse "A" (Fig. 8), a switch lever 20 coacting therewith so that if upon receipt of the second impulse "B," or "C," or "D," etc. the notch 10*a* in the lip of the cup-shaped code wheel is opposite the turned-away flange 20*a*, the flange can pass through the lip of the cup when the switch lever 20 is magnetically rocked clockwise, and a switch-actuating cam 30 rotating with the code wheel 10 to coact with the flange 20*a* when it is within the cup to further rock the switch lever 20 to actuate the switch 40 to energize the local work circuit. The angular position of the notch 10*a* relative to the flange 20*a* when the device is at rest determines to which of the "B" through "H" impulses the device is responsive, in that all of the switching devices are initially set in motion by the "A" impulse. It should be noted at this time that the location of the notch 10*a* in the code wheel is adjustable, but that the position of the switch actuating cam 30 relative to the flange 20*a* is fixed so that the energization of any local work circuit always occurs fifty seconds after the beginning of the "A" impulse as is shown in Fig. 7 at "K," "L," or "M."

The switch unit, which is small enough to fit within a clock case and shares the tuned receiver with the clock, is mounted on a common base plate 11 to which are affixed pivot studs 12, 13 and 14, and the synchronous motor 15. Adjacent to the base plate 11 and pivotable on the stud 12 is a flat bellcrank 16 having an upper arm and a second arm depending to the right (as viewed in Fig. 1) to which is attached the spring 17 to bias the bellcrank in a counter-clockwise direction. Adjacent to the bellcrank 16 and also pivotable on the stud 12 is the essentially flat lever 18 having two upstanding flanges 18*a* and 18*b* at its upper end and at its lower end a stud 18*c* upon which rotates an idler gear 19. Adjacent the lever 18 and rotatable on stud 12 is a combination cam and gear 21, the gear portion 21*a* thereof being in mesh with the idler gear 19, and the cam portion being essentially a disc having a cutaway portion 21*b*. Fitted over a hub of the cam portion of 21 are the cup-shaped code wheel 10 and the switch actuating cam 30 held in place by nut 22 threaded on the stud 12. The cup-shaped code wheel 10 has a notch 10*a* in the upturned lip thereof and a series of locating holes 10*b* in the web. The switch actuating cam 30 has a downturned flange portion 30*a* which passes through one of the holes 10*b* in the web of code wheel 10 into a socket 21*c* in the face of the cam gear combination 21 to fix the relativity of these parts. Thus by removing nut 22 it is possible to reposition the code wheel 10 into any one of a plurality of angular positions as determined by the spacing of the holes 10*b*, yet the flange 30*a* fixes the position of the switch actuating cam relative to the cam-gear 21. The holes 10*b* are spaced at 30 degree intervals inasmuch as the "B" through "H" pulses (Fig. 7) are spaced at five-second intervals and the code wheel revolves at one revolution per minute, the orientation of the holes relative to notch 10*a* being arranged so that the notch 10*a* can be positioned selectively at 90, 120, 150, 180, 210, 240 or 270 degrees from the coaction with flange 20*a* of switch lever 20 these positions corresponding to the code setting receptive to the "A" through "H" impulses respectively.

Pivoted on stud 13 is a rock lever 23 biased in a counter-clockwise direction by spring 24, and coacting with the cutaway portion 21*b* of the cam and gear combination 21 to act as a detent. The upper end of rock lever 23 coacts with the upstanding flange 18*a* of lever 18 for a purpose to be described. Both the lever 18 and the bellcrank 16 are rocked clockwise by the attraction of the armature 25 which abuts the edges of the upper arms of both the bellcrank 16 and the lever 18. The armature 25 is attracted by the electromagnet 26 whenever a signal is impressed on the line. Clockwise rocking of lever 18 brings flange 18*b* into coaction with switch 27, and meshes idler gear 19 with a gear 28 on the shaft of motor 15. The clockwise rotation of bellcrank 16 through the link 29 rocks the switch lever 20 clockwise. The self-centering spring connection 31 between the link 29 and the switch lever 20 permits the switch lever 20 to follow the motion of link 29 only so long as lever 20 is free from restraint.

Referring now to Fig. 8 when a signal impulse is received the relay 70 is energized closing its points 70*a* as previously described. Closure of these points establishes a circuit from line 60*a* through magnet 26 the now closed points 70*a* to line 60*b*. Thus energized the magnet 26 rocks lever 18 (Fig. 1) clockwise to coact with and close switch 27. Thus closed, switch 27 provides an energizing circuit for motor 15 (Fig. 1).

Figure 2:
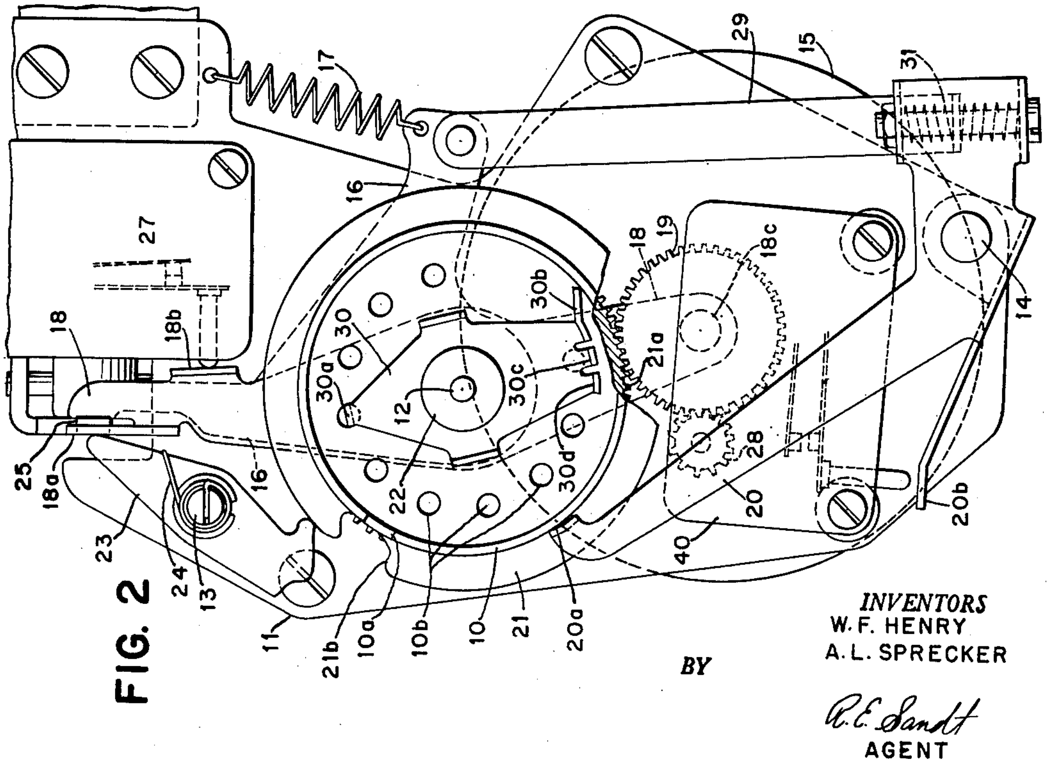
Fig. 2 is a view comparable to Fig. 1 the parts being shown in their relative position shortly before cessation of the initiating impulse.

In Fig. 1 the parts are shown in their initial or reset position with the magnet 26 deenergized. Upon energization of magnet 26 as above described the lever 18 and the bellcrank 16 will be rocked clockwise through the attraction and movement of armature 25. The rocking of lever 18 engages idler 19 with gear 28 on the shaft of motor 15, now revolving, so that a drive is transmitted from gear 28 through idler 19 to the gear portion 21*a* of the cam gear combination 21 so that it begins to rotate counterclockwise. If the signal is of sufficient duration the assembly consisting of the cam-gear 21, code wheel 10, and switch actuating cam 30 will rotate to the position shown in Fig. 2 wherein the magnet 26 is still energized, the drive engaged and rotating, and the rock lever 23 has been cammed out of the cutaway portion 21*b* and rocked clockwise to bear against the upturned flange 18*a* of lever 18 thus holding it rocked in a clockwise direction so that the flange 18*b* will hold the motor switch 27 closed to maintain the motor circuit, and the gears 19 and 28 will be held in mesh. It will be noted that the bellcrank 16 is also rocked, as is the switch lever 20 whose flange 20*a* bears against the upturned flange of the code wheel 10, the self-centering spring connection 31 yielding to permit the link 29 to overtravel. In this position the finger 20*b* is inoperative to coact with switch 40 which is in the local work circuit.

Figure 3:
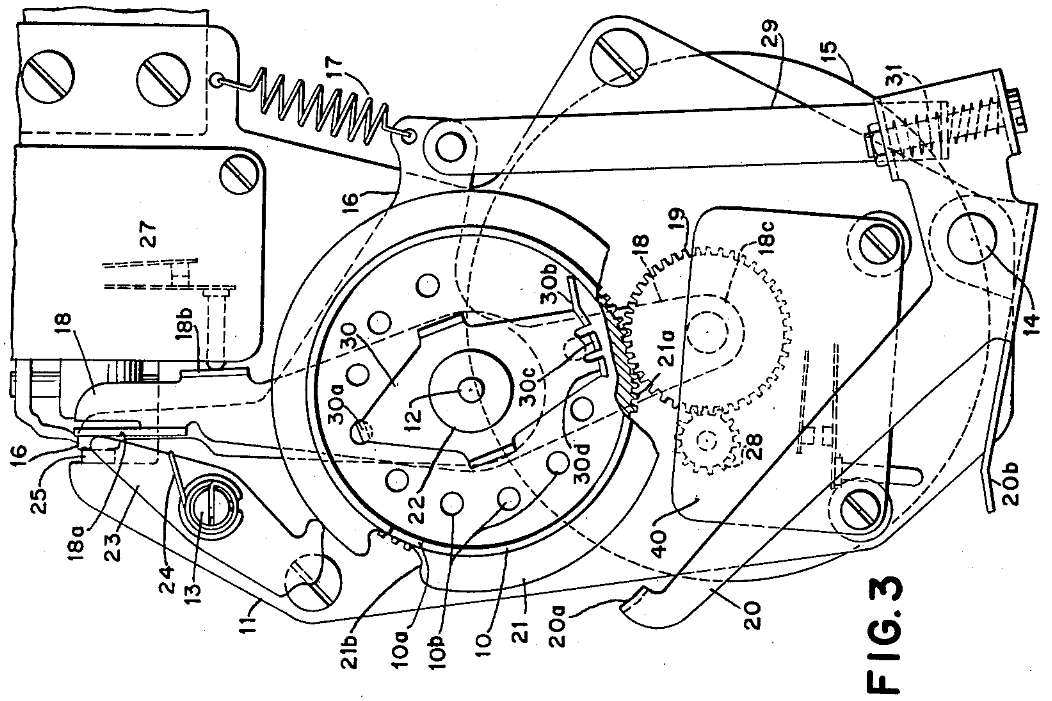
Fig. 3 is a view comparable to Figs. 1 and 2 the parts being shown in their relative position shortly after cessation of the initiating impulse.

Upon cessation of the initiating or "A" impulse, the parts assume the position shown in Fig. 3 wherein the armature 25 is released, the bellcrank 16 rocked counter-clockwise, and the rock lever 23 is held in coaction with the lever 18 to hold both the gear mesh and the motor circuit through switch 27. The relative disposition of the parts at this point in the cycle of operation is more fully shown in the perspective view of Fig. 3*a* wherein the coaction of armature 25, bellcrank 16, lever 18 and attendant flanges **18*a* and 18*b*, rock lever 23, and switch 27** is fully apparent.

Figure 4:
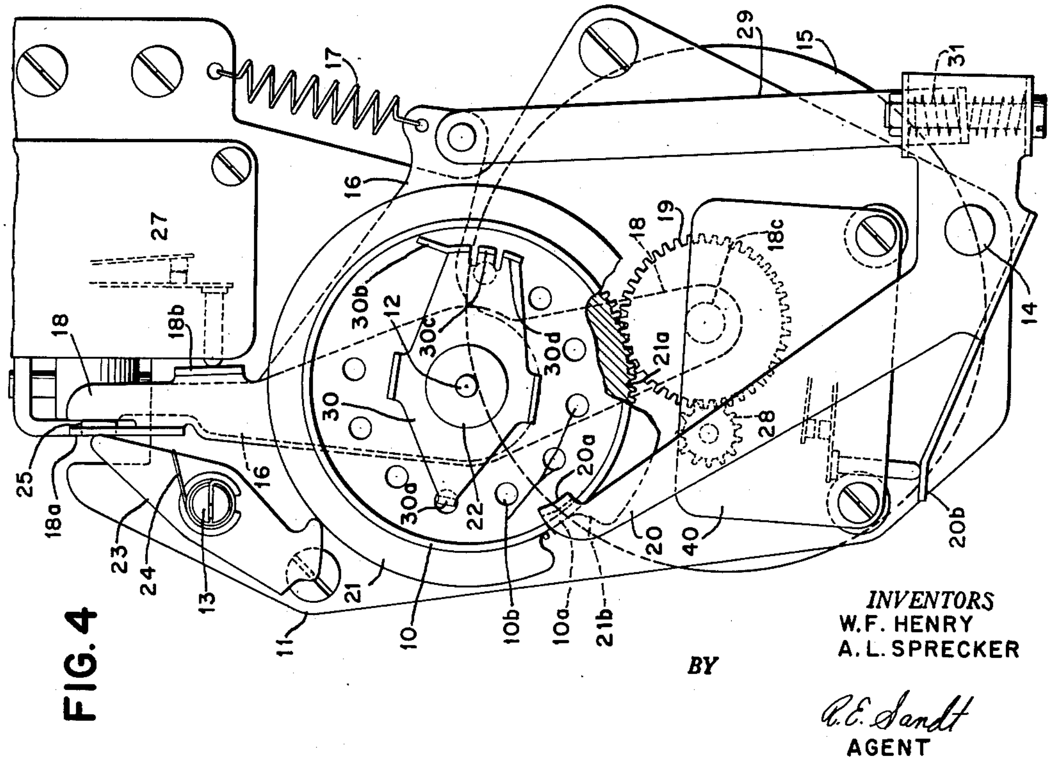
Fig. 4 is a front elevation of the device with the parts in their relative position at the time of the second impulse.

Upon receipt of a second impulse timed to the selected switching device the code wheel will have rotated to the position shown in Fig. 4 with the cutout portion **10*a* of the code wheel 10 opposite the flange 20*a*, whereupon energization of magnet 26 will rock bellcrank 16 clockwise thus rocking switch lever 20 clockwise so that the flange 20*a* will pass through the cutout portion 10*a* in the lip of the code wheel 10 and will ride on the inside of the lip during subsequent rotation thereof. It will be noted that the tab 20*b* of lever 20 is still inoperative to close the switch 40**.

Figure 5:
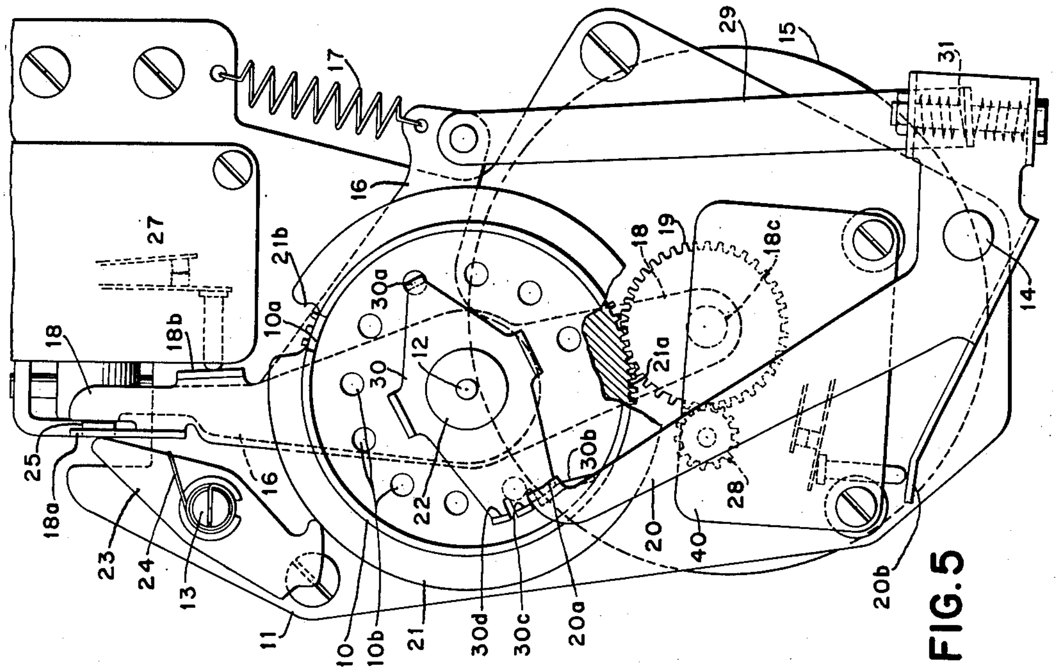
Fig. 5 is a front elevation of the device with the parts in their relative position when the local work circuit is actuated.

With the flange **20*a* of switch operating lever 20 on the inside of the flange of the code wheel 10, continued rotation of the code wheel will interpose the inclined surface 30*b* between the lip of the code wheel 10 and the flange 20*a* thus camming the flange 20*a* toward the center of the code wheel and rocking the switch operating lever 20 further clockwise so that the tab 20*b* coacts with the switch 40 to energize the local work circuit, in the illustrative use chosen, the buzzer 41 shown in the circuit in Fig. 8. In order to provide a variable duration of closing for the local work circuit, the switch operating cam 30 in addition to having the inclined surface 30*b* is provided with two separated upturned flanges 30*c* and 30*d*, which flanges can be broken off at the web to provide a variable dropoff point for the switch operating lever 20. The inclined surface 30*b* alone will produce a duration of three seconds, 30*b* and 30*c* a duration of five seconds, and 30*b*, 30*c*, and 30*d*** a duration of eight seconds, the circuit always being initially closed fifty seconds after the beginning of rotation of the code wheel. This action is shown in Fig. 5.

Further rotation of the code wheel 10 restores the switching device to its initial position as shown in Fig. 1 except that the switch operating lever is now riding on the inner surface of the lip of code wheel 10. Upon reaching the initial or reset position the cutaway portion **21*b* of the cam-gear combination will be opposite the rock lever 23 so that its coacting spring 24 will rock it counter-clockwise into the cutaway portion 21*b*, thus allowing the lever 18 to rock counter-clockwise to demesh gears 19 and 28 and also to break the motor circuit by opening switch 27. The rock lever 23 coacting with the opening 21*b*** acts as a detent to position the rotating assembly in the initial or reset position.

An important function of the rock lever 23 and the coacting mechanism is that of filtering out spurious or unwanted signals such as transients on the line occasioned by high frequency transients generated by other pieces of electrical equipment. If, for example, a transient of essentially signal frequency were received when the switching device was in the initial or reset position, the magnet 26 will be energized and the armature 25 will be attracted as previously described. The motor 15 will be energized and the drive will be connected, also as previously described, and the cam and gear 21 will begin to rotate to rock the rock lever 23 in a clockwise direction. As the transient is less than the required minimum of 3.4 seconds the rock lever 23 will not have been sufficiently rocked to coact with the lever 18 when the energization of magnet 26 ceases. The configuration of the cutaway portion **21*b* and of the rock lever 23, and the interaction of these parts with the lever 18 has been so designed that the magnet 26 must be energized for the minimum duration of 3.4 seconds in order that the cam-gear combination 21** will rotate through an angle sufficient to rock the lever

23 out of the cutaway portion **21*b*. If it is not so rocked the lever 18, upon cessation of the energization of the magnet 26 by an impulse of less than 3.4 seconds, will not be held in its maximum clockwise position and the motor circuit will be opened through switch 27 to stop the motor. The rock lever 23 is still in engagement with the cutout 21*b* and because of its spring bias will rock counterclockwise to return the cam-gear combination to its initial or reset position, and the lever 18 under the urging of the spring inherent in the switch 27 will follow the lever 23 to break the mesh between gears 19 and 28**, and the switching device will be reset to its initial position as shown in Fig. 1. Thus the switching device can be set in continuous rotation only by a signal of the predetermined minimum duration of 3.4 seconds, and will be immediately reset to the initial position upon the cessation of a signal of less than this predetermined minimum duration. This structure further prevents transient impulses from accumulating so as to add to the required 3.4 seconds and thus also cause a spurious operation of the switching device.

As is shown in Fig. 8*a*, all of the switching devices 50 are connected to the common power line **60*a* and 60*b* so that any signal impulses impressed thereon will affect all of the switching devices. Therefore, with the receipt of the initiating "A" impulse all of the switching devices will be set in rotation and will complete their cycle of rotation in one minute. Only the selected one which is set to be receptive to the code transmitted will operate to close the local work circuit as previously described. All other of the non-selected units will have the notch 10*a* of the code wheel 10 in some angular position other than opposite the flange 20*a* of the switch operating lever 20 when the second impulse is received. If the flange 20*a* is outside of the lip of the code wheel 10 of these units it will be restrained from passing therethrough when so urged by the impulsing of the magnet 26 on receipt of the second impulse. If the flange is bearing on the inner surface of the lip of the code wheel the energization of the magnet 26 by the second impulse will only tend to rock the lever 20 to a position which it already occupies. At some time during the cycle, however, the notch 10*a* will be opposite the flange 20*a*, and the flange 20*a* under the urging of the self-centering spring connection 31 will pass from the inside to the outside of the lip of the code wheel 10. Thus all units for which no corresponding code was transmitted will have their switch operating levers 20 rocked out of possible coaction with the switch operating cam 30**.

Although the switching device has been shown in conjunction with the electronic clock system disclosed in the referenced Wagner et al. application, it is perfectly feasible to wire the devices directly to a common signal line. In this case the tuned receiver would be eliminated and the relay 70 (Fig. 8) would be directly energized by the pulses transmitted on the signal line. In this instance it is possible to add two additional units to the line inasmuch as the "I" and "J" pulses shown dotted in Fig. 7 can be utilized, as there is no clock synchronizing pulse in such a system which could interfere with these two additional pulses.

In an application other than pure signalling such as, for instance, the turning on and off of lights, it is contemplated to add a second code wheel 10 to the common drive mechanism as well as a second switch lever 20 and switch 40. In this application one of the switches 40 would be operated responsive to one code to energize the pickup coil of a latch-type relay such as that disclosed in U. S. Patent 2,510,604, issued June 6, 1950, to W. Pfaff et al. to energize the lighting circuit which will be held energized by the action of the latching mechanism of the relay. The second switch 40 operated responsive to a different code energizes the unlatching coil of the above relay to deenergize the local lighting circuit.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a selective switching device, the combination of a signal line, a magnet connected to said line and operated responsive to electrical impulses transmitted thereover, a motor, a normally deenergized circuit for said motor, a rotatable member comprising first and second cams and a cup-shaped code wheel having a notch in the lip thereof, a normally disconnected drive between said motor and said rotatable member, means controlled by said magnet operated in response to an initial impulse to energize said circuit and connect said drive, lever means coacting with said magnet-controlled means when said magnet is operated by an initial impulse having a predetermined minimum duration for holding said circuit energized and said drive connected, a switch, and switch actuating means controlled by said magnet and operable to pass through said notch in said code wheel when said magnet is operated responsive to a second impulse at a predetermined time interval after said initial impulse and coact with said second cam to actuate said switch.

2. In a selective switching device, the combination of a signal line, a magnet connected to said line and operated responsive to electrical impulses transmitted thereover, a motor, a normally deenergized circuit for said motor, a rotatable member comprising first and second cams and a cup-shaped code wheel having a notch in the lip thereof, a normally disconnected drive between said motor and said rotatable means, means controlled by said magnet operated in response to an initial impulse to energize said circuit and connect said drive, lever means coacting with said magnet-controlled means when said magnet is operated by an initial impulse having a predetermined minimum duration for holding said circuit energized and said drive connecter, a switch, switch actuating means controlled by said magnet and operable to pass through said notch in said code wheel when said magnet is operated responsive to a second impulse at a predetermined time interval after said initial impulse and coact with said second cam to actuate said switch, and means coacting with said lever means for deenergizing said circuit and disconnecting said drive when said magnet is operated by an initial impulse of less than the predetermined minimum duration.

3. In a selective switching device, the combination of a signal line, means connected to said line and operated responsive to impulses transmitted thereover, cyclical means, initiating means controlled by said line connected means in response to an initial impulse for initiating the operation of said cyclical means, means coacting with both said cyclical means and said initiating means when said line connected means is operated responsive to an initial impulse having a predetermined minimum duration for continuing the operation of said cyclical means, switching means, further means controlled by said line connected means to coact with said cyclical means when said line connected means is operated responsive to a second impulse at a predetermined time interval after said initiating impulse to render said further means operative for subsequent operation by said cyclical means, and means associated with said cyclical means for operating said further means to actuate said switching means at a third predetermined time after said initial impulse.

4. In a selective switching device, the combination of a signal line, means connected to said line and operated responsive to impulses transmitted thereover, cyclical means, initiating means controlled by said line connected means in response to an initial impulse for initiating the operation of said cyclical means, means coacting with both said cyclical means and said initiating means when said line connected means is operated responsive to an initial impulse having a predetermined minimum duration for continuing the operation of said cyclical means, switching means, further means controlled by said line connected means to coact with said cyclical means when said line connected means is operated responsive to a second impulse at a predetermined time interval after said initiating impulse to operate said switching means, and means operable when said line-connected means is operated responsive to an initial impulse having less than the predetermined minimum duration for restoring said cyclical means to its condition prior to the initiating of operation by the initiating means.

5. In a selective switching device, the combination of a signal line, a magnet connected to said line and operated responsive to electrical impulses transmitted thereover, a rotary member, a normally inoperative drive for said rotary member, means controlled by said magnet in response to an initial impulse for rendering said drive operative, means controlled by said rotary member when said magnet is operated responsive to an initial impulse having a predetermined minimum duration for holding said drive operative, a switch, switch actuating means rendered operative jointly by said magnet and said rotary member when said magnet is operated responsive to a second impulse at a predetermined time interval after said initial impulse to operate said switch, and means carried by said rotary member for operating said switch actuating means to actuate said switch at a third predetermined time interval after said initial impulse when said switch-actuating means is rendered operative.

6. In a selective switching device, the combination of a signal line, a magnet connected to said line and operated responsive to electrical impulses transmitted thereover, a rotary member, a normally inoperative drive for said rotary member, means controlled by said magnet in response to an initial impulse for rendering said drive operative, means controlled by said rotary member when said magnet is operated responsive to an initial impulse having a predetermined minimum duration for holding said drive operative, a switch, switch actuating means jointly controlled by said magnet and said rotary member when said magnet is operated responsive to a second impulse at a predetermined time interval after said initial impulse to operate said switch, and means operable when said magnet is operated responsive to an impulse of less than the predetermined minimum duration to reset said rotary member to its initial position.

References Cited in the file of this patent

UNITED STATES PATENTS

| | | |
|---|---|---|
| 888,153 | Franke | May 19, 1908 |
| 1,163,883 | Boswau | Dec. 14, 1915 |
| 1,645,563 | Whistlecroft | Oct. 18, 1927 |
| 1,924,795 | Lipmann et al. | Aug. 29, 1933 |
| 2,485,551 | Angel | Oct. 25, 1949 |
| 2,568,836 | Tobler | Sept. 25, 1951 |